June 1, 1965     A. J. LINGENFELTER     3,186,088
FRUIT AND VEGETABLE PEELER
Filed June 13, 1963
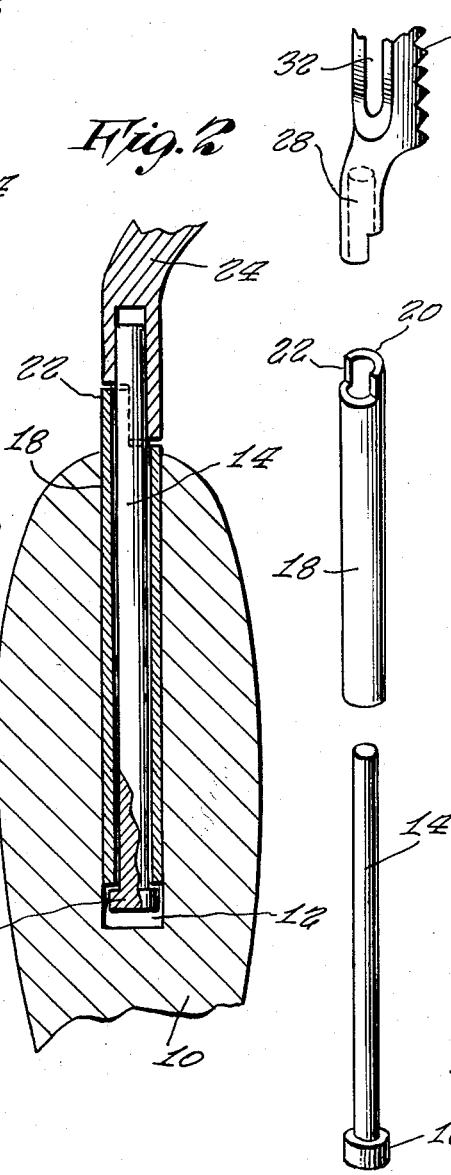
INVENTOR.
ALLAN J. LINGENFELTER United States Patent Office 3,186,088
Patented June 1, 1965

3,186,088
FRUIT AND VEGETABLE PEELER
Allan J. Lingenfelter, 167 Edward St.,
New Kensington, Pa.
Filed June 13, 1963, Ser. No. 287,670
2 Claims. (Cl. 30—279)

My invention relates to fruit and vegetable peelers.

It is an object of my invention to provide a new and improved peeler having a blade which can follow the contour of the item being pared, whereby a thin economical peeling action ensues.

Another object is to provide a new and improved peeler having a solid comfortable handle of contemporary design with resultant improvement in utility, comfort and appearance.

Still another object is to provide a new and improved peeler of the character indicated which can be manufactured easily and inexpensively.

All of the foregoing and still further objects and advantages of my invention will now be explained with reference both to this specification and to the accompanying drawings wherein:

FIGURE 1 is a perspective view of my invention.

FIGURE 2 is an enlarged cross-section through 2—2 of FIGURE 1;

FIGURE 3 is an exploded view of the elements of my invention; and

FIGURE 4 is an enlarged detail view of my invention.

Referring now to FIGURES 1-4, there is provided a resin impregnated hard rubber or pakkawood handle 10 having an axial bore 12 extending downward therein from the top end of the handle. A steel shaft 14 having an enlarged head 16 at one end thereof is forced down (head downward) into bore 12, whereby a short end section of shaft 14 extends upward beyond the top end of the handle. The diameter of bore 12 is only slightly larger than head 16.

A hollow aluminum tube 18 open at both ends is press-fitted into the bore 12 around shaft 14. The top end 20 of the tube 18 (which extends beyond the top end of the handle but below the exposed end section of shaft 14 has a portion cut away whereby the top end assumes the shape of a cut away half section 22 which in cross section has the shape of a half circle). A peeling blade 24 has a top point 26, a bottom shaft 28 and a mid-section 30 having a cut away center 32 and cutting teeth 34. Shaft 28 is hollow and is press-fitted over the top end of shaft 14. The bottom end of shaft 28 also has a cut away section leaving an exposed cut away portion which in cross section has the shape of an arc of a circle less than 180° which for example can be 90°. As a result, blade 24 can rotate as much as 45° either clockwise or counter-clockwise about tube 18 (since shaft 14 is free to rotate in tube 18, whereby during peeling, the blade can follow the contour of the item to be peeled).

While I have described my invention with particular reference to the drawings, my protection is to be limited only by the terms of the claims which follow.

I claim as follows:

1. A fruit and vegetable peeler comprising an elongated handle having an axially positioned bore extending inwardly from one end of the handle to a point intermediate both ends thereof, a hollow aluminum cylindrical tube open at both ends press-fitted into said bore and having a top end extending beyond the handle, said top end having a portion removed such that the top end assumes the shape of a cut-away half section which in cross-section has the shape of a half circle, a solid shaft fitted into said tube and having a bottom enlarged end extending between the bottom of the bore and the bottom end of said tube, the top end of said shaft extending above the top end of said tube, a hollow shaft having an open bottom end press-fitted over the top end of said shaft, said bottom end of said hollow shaft having a portion removed such that this bottom end takes the shape of a cutaway section which in cross-section has the shape of an arc of a circle which is less than 180°, the top end of said tube being in engagement with the bottom end of said hollow shaft whereby the hollow shaft can be rotated clockwise and counter-clockwise over a total arc less than 180°, and a peeler blade secured to the top end of said hollow shaft.

2. A peeler as set forth in claim 1, wherein the cutaway section of the bottom end of the hollow shaft has the shape of an arc of a circle of about 90° and wherein the total arc is about 90°.

References Cited by the Examiner
UNITED STATES PATENTS

| 2,274,815 | 3/42 | Whann | 30—279 |
| 2,351,327 | 6/44 | Gamache | 30—279 |
| 2,450,347 | 9/48 | Krilow | 30—279 |

WILLIAM FELDMAN, *Primary Examiner.*
MILTON S. MEHR, *Examiner.*